(12) United States Patent
Park

(10) Patent No.: US 7,905,512 B2
(45) Date of Patent: Mar. 15, 2011

(54) VEHICULAR INSTRUMENT PANEL

(75) Inventor: Jang Yeol Park, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 436 days.

(21) Appl. No.: 12/044,106

(22) Filed: Mar. 7, 2008

(65) Prior Publication Data

US 2009/0115171 A1 May 7, 2009

(30) Foreign Application Priority Data

Nov. 1, 2007 (KR) .......................... 10-2007-0111002

(51) Int. Cl.
*B60R 21/20* (2006.01)
*B60R 21/205* (2006.01)
(52) U.S. Cl. ...................................... 280/728.3; 280/732
(58) Field of Classification Search ................ 280/728.3, 280/732
See application file for complete search history.

(56) References Cited

U.S. PATENT DOCUMENTS

| | | | |
|---|---|---|---|
| 5,060,971 A * | 10/1991 | Nanbu et al. ................ | 280/728.3 |
| 7,226,079 B2 | 6/2007 | Hier et al. | |
| 7,770,916 B2 * | 8/2010 | Okumura et al. ........... | 280/728.3 |
| 2004/0108745 A1 | 6/2004 | Yang | |
| 2004/0160043 A1 * | 8/2004 | Litjens et al. .................. | 280/732 |
| 2004/0207181 A1 * | 10/2004 | Hayashi et al. ............. | 280/728.3 |
| 2005/0134023 A1 * | 6/2005 | Cowelchuk et al. ........ | 280/728.3 |
| 2005/0275238 A1 | 12/2005 | Yang | |
| 2006/0040605 A1 | 2/2006 | Lee | |
| 2006/0131100 A1 | 6/2006 | Choi | |
| 2006/0220354 A1 * | 10/2006 | Geltinger et al. ........... | 280/728.3 |
| 2006/0290110 A1 * | 12/2006 | Diemer et al. .............. | 280/728.3 |

* cited by examiner

*Primary Examiner* — Paul N Dickson
*Assistant Examiner* — Joseph Rocca
(74) *Attorney, Agent, or Firm* — Green Blum & Bernstein P.L.C.

(57) ABSTRACT

Disclosed is a vehicular instrument panel, and more particularly, is a vehicular instrument panel in which a door portion can be easily cut away from an instrument panel for the inflation of an air bag upon a car collision. The vehicular instrument panel includes a door portion provided on the instrument panel at a position corresponding to an air bag, and a tear line provided on the instrument panel to define a boundary between the door portion and the instrument panel, the tear line being torn upon a car collision. The tear line includes several sections having different shapes from one another.

20 Claims, 5 Drawing Sheets

VEHICULAR INSTRUMENT PANEL

BACKGROUND OF THE INVENTION

1. Field of the Invention

The present invention relates to a vehicular instrument panel, and more particularly, to a vehicular instrument panel in which a door portion can be easily cut away from an instrument panel for the inflation of an air bag upon a car collision.

2. Description of the Related Art

FIG. 1 is a perspective view illustrating a conventional vehicular instrument panel.

Referring to FIG. 1, the conventional vehicular instrument panel 10 includes an air bag module (not shown) mounted in the instrument panel 10 to secure the safety of a passenger sitting on a front passenger's seat, and a door portion 20 formed on the instrument panel 10 at a position corresponding to the air bag module.

More particularly, when the door portion 20 is integrally formed with the instrument panel 10 made of a hard material, a tear line 30 is formed on an inner wall surface of the instrument panel 10 to define the door portion 20. The tear line 30 is a dotted line, along which recesses are formed consecutively.

If an air bag is inflated upon a car collision, the door portion 20 of the instrument panel 10 is cut away along the tear line 30 and is separated from the instrument panel 10. The air bag can be inflated through a hole produced by separation of the door portion 20, thereby preventing the passenger from colliding with the instrument panel 10.

In the above described conventional vehicular instrument panel, the recesses constituting the tear line of the door portion have the same shape as one another. Therefore, when the door portion is separated from the instrument panel, the door portion has an irregular cut starting point. This makes the separation of the door portion difficult.

Further, in the door portion of the conventional vehicular instrument panel, since the recesses of the tear line are formed by use of laser, the use of expensive laser equipment is inevitable, and consequently, the conventional vehicular instrument panel has a problem of high manufacturing costs.

SUMMARY OF THE INVENTION

Therefore, the present invention has been made in view of the above problems, and it is an object of the present invention to provide a vehicular instrument panel, which can assure easy inflation of an air bag upon a car collision.

It is another object of the present invention to provide a vehicular instrument panel, which can reduce manufacturing costs of an instrument panel assuring easy inflation of an air bag upon a car collision.

In accordance with the present invention, the above and other objects can be accomplished by the provision of a vehicular instrument panel comprising: a door portion provided on the instrument panel at a position corresponding to an air bag; and a tear line provided on the instrument panel to define a boundary between the door portion and the instrument panel, the tear line being torn upon a car collision, wherein the tear line comprises several sections having different shapes from one another.

The tear line may comprise: an exploding section defining a lower end of the door portion and adapted to be torn firstly upon the inflation of the air bag; sidewall sections defining both side ends of the door portion and adapted to be torn secondly upon the inflation of the air bag; and a hinge section defining an upper end of the door portion and adapted to be torn thirdly upon the inflation of the air bag.

The exploding section may comprise: a plurality of first recesses arranged consecutively by a predetermined interval; and first protrusions located between the respective first recesses, wherein the first protrusions have a thickness thinner than a thickness of the instrument panel.

Each of the sidewall sections may comprise: a plurality of second recesses arranged consecutively by a predetermined interval; and second protrusions located between the respective second recesses, wherein the second protrusions have a thickness thinner than the thickness of the instrument panel and a length longer than a length of the first protrusions.

The hinge section may comprise: a plurality of third recesses arranged consecutively by a predetermined interval; and third protrusions located between the respective third recesses, wherein the third protrusions have a thickness thicker than the thickness of the first protrusions.

Each of the sidewall sections may comprise: a plurality of second recesses arranged consecutively by a predetermined interval; and second protrusions located between the respective second recesses, wherein a thickness of the second protrusions is thinner than the thickness of the third protrusions, but is thicker than the thickness of the first protrusions.

The third protrusions may have the same thickness as the thickness of the instrument panel.

The tear line may comprise: an exploding section located at the center of the door portion and adapted to be torn firstly upon the inflation of the air bag; sidewall sections defining both side ends of the door portion and adapted to be torn secondly upon the inflation of the air bag; and hinge sections defining upper and lower ends of the door portion and adapted to be torn thirdly upon the inflation of the air bag.

The exploding section may comprise: a plurality of first recesses arranged consecutively by a predetermined interval; and first protrusions located between the respective first recesses, wherein the first protrusions have a thickness thinner than a thickness of the instrument panel.

Each of the sidewall sections may comprise: a plurality of second recesses arranged consecutively by a predetermined interval; and second protrusions located between the respective second recesses, wherein the second protrusions have a thickness thinner than the thickness of the instrument panel and a length longer than a length of the first protrusions.

Each of the hinge sections may comprise: a plurality of third recesses arranged consecutively by a predetermined interval; and third protrusions located between the respective third recesses, wherein the third protrusions have a thickness thicker than the thickness of the first protrusions.

Each of the sidewall sections may comprise: a plurality of second recesses arranged consecutively by a predetermined interval; and second protrusions located between the respective second recesses, wherein a thickness of the second protrusions is thinner than the thickness of the third protrusions, but is thicker than the thickness of the first protrusions.

The third protrusions may have the same thickness as the thickness of the instrument panel.

The tear line may be formed by milling.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
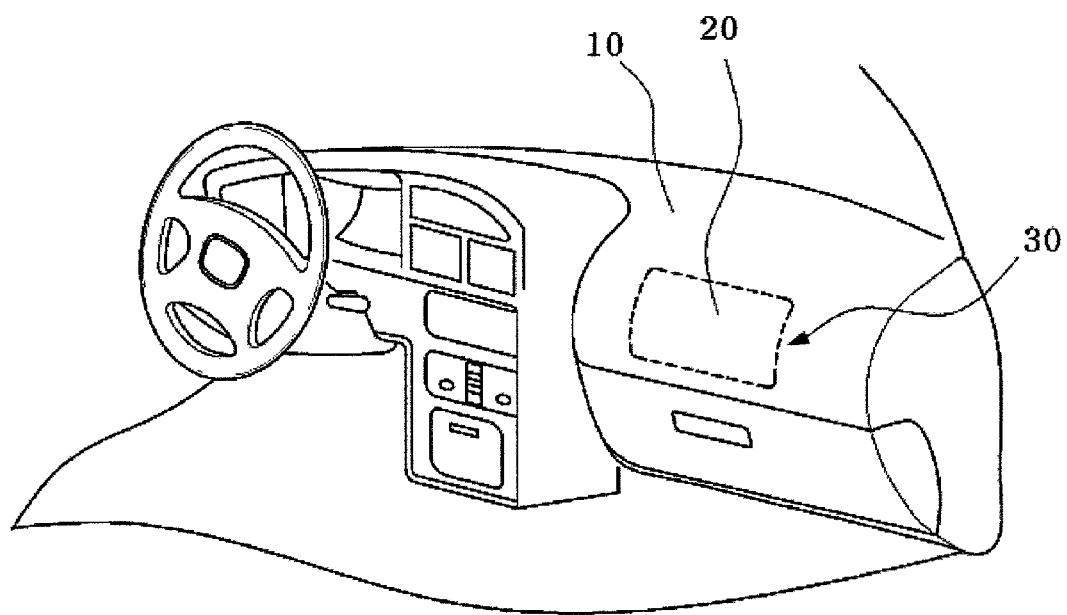
FIG. 1 is a perspective view illustrating a conventional vehicular instrument panel.

Now, preferred embodiments according to the present invention will be described with reference to the accompanying drawings.

For the convenience of description, a vehicular instrument panel will be described by example.

In the drawings, the thickness of lines or the size of constituent elements may be exaggerated for the clear understanding and convenience of description.

Also, the terms used in the following description are terms defined taking into consideration the functions obtained in accordance with the present invention, and may be changed in accordance with the option of a user or operator or a usual practice.

Therefore, the definitions of these terms should be determined based on the whole content of this specification.

Meanwhile, for the convenience of description, elements having the same configuration and operation as those of the prior art are designated by the same reference numerals and names.

Figure 2:
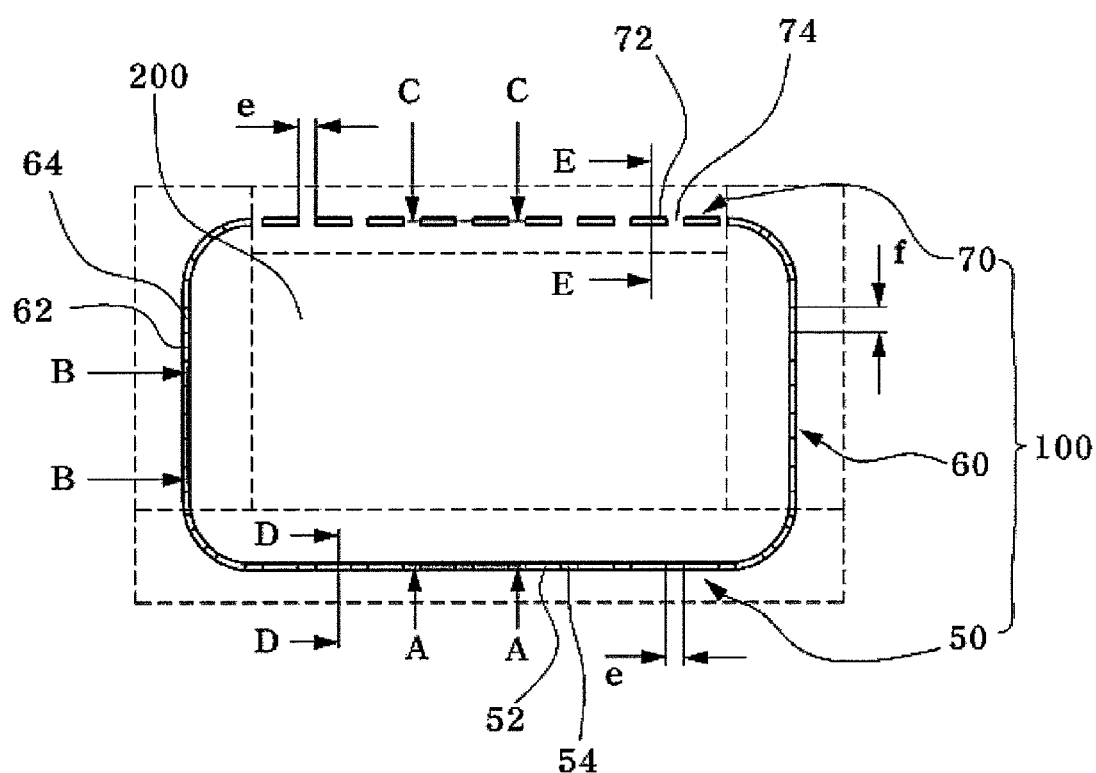
FIG. 2 is a bottom view illustrating a door portion of a vehicular instrument panel according to an embodiment of the present invention.
Figure 3:
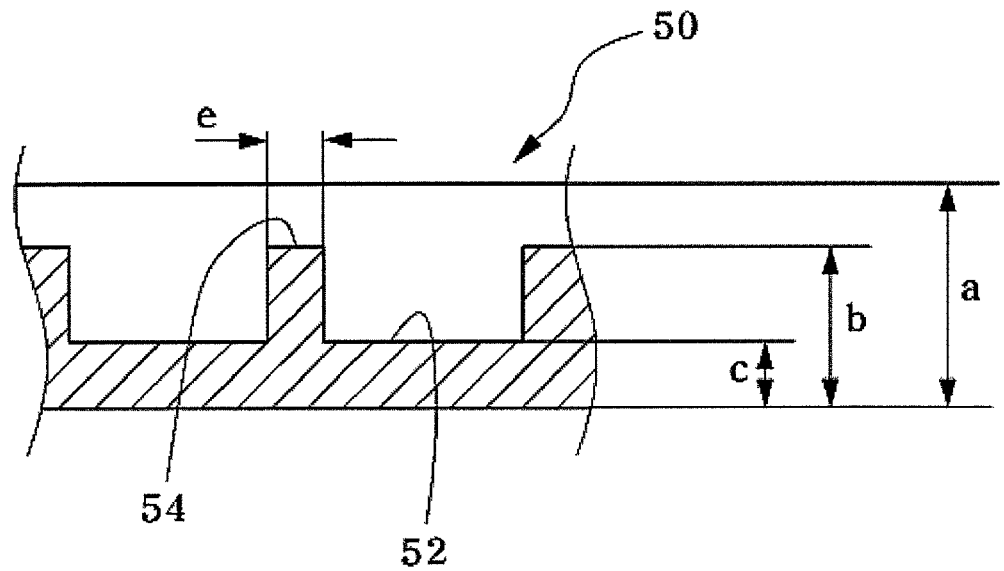
FIG. 3 is a sectional view taken along the line A-A shown in FIG. 2.
Figure 4:
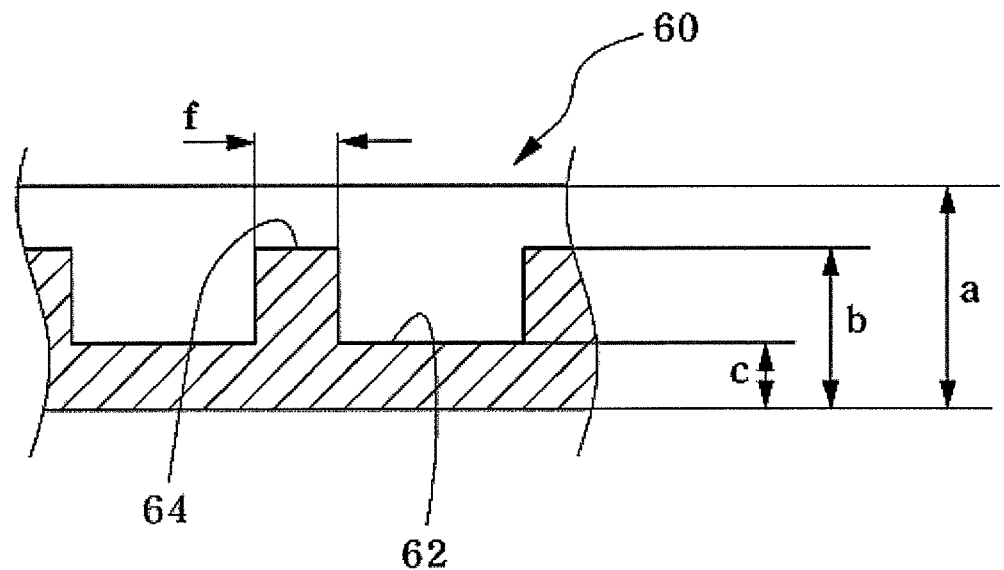
FIG. 4 is a sectional view taken along the line B-B shown in FIG. 2.
Figure 5:
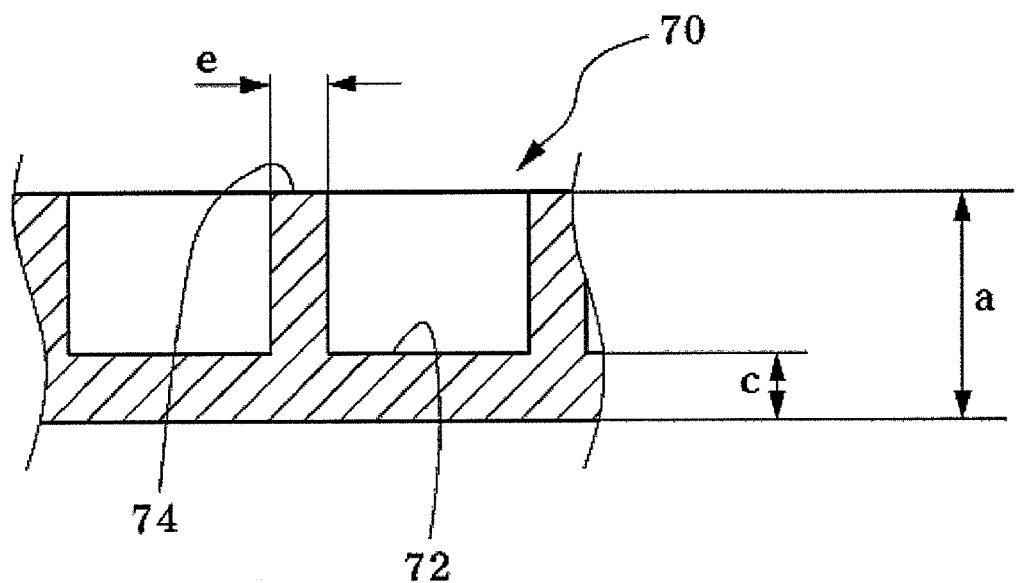
FIG. 5 is a sectional view taken along the line C-C shown in FIG. 2.

FIG. 2 is a bottom view illustrating a door portion of a vehicular instrument panel according to an embodiment of the present invention. FIG. 3 is a sectional view taken along the line A-A shown in FIG. 2, FIG. 4 is a sectional view taken along the line B-B shown in FIG. 2, and FIG. 5 is a sectional view taken along the line C-C shown in FIG. 2.

Figure 6:
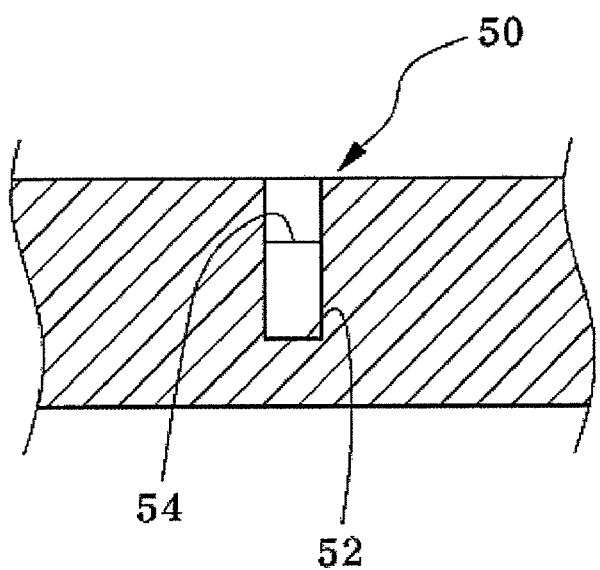
FIG. 6 is a sectional view taken along the line D-D shown in FIG. 2.
Figure 7:
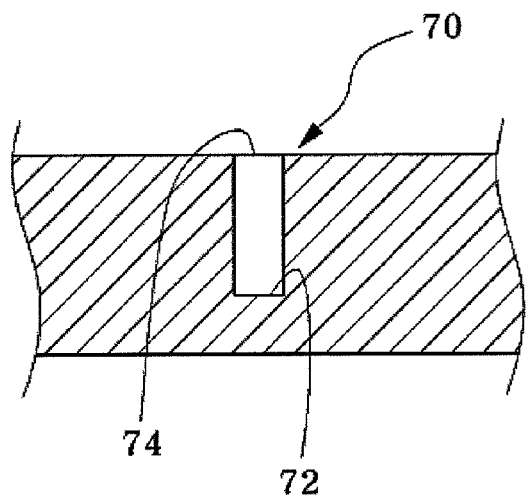
FIG. 7 is a sectional view taken along the line E-E shown in FIG. 2.

Also, FIG. 6 is a sectional view taken along the line D-D shown in FIG. 2, and FIG. 7 is a sectional view taken along the line E-E shown in FIG. 2.

Referring to FIGS. 2 to 7, the vehicular instrument panel according to an embodiment of the present invention (See reference numeral 10 in FIG. 1) includes a door portion 200 formed on the instrument panel 10 at a position corresponding to an air bag (not shown), and a tear line 100 formed on the instrument panel 10 to define a boundary between the door portion 200 and the instrument panel 10, the tear line 100 being adapted to be torn upon a car collision.

In the present invention, the tear line 100 consists of several sections having different shapes from one another.

When an air bag is inflated upon a car collision, the air bag pushes the door portion 200 out of the instrument panel 10, causing the tear line 100 to be torn. In this case, since the tear line 100 consists of several sections having different shapes from one another, the tear line 100 is torn starting from a specific location thereof.

Then, as the remaining portion of the tear line 100 is torn consecutively, the door portion 200 can be cut away in a direction, making a hole in the instrument panel 10.

In the case where the door portion 200 is configured to be cut away starting from a partial region thereof, the cutting of the door portion 200 can be initiated by a smaller pressure as compared to the case where the overall tear line 100 is torn at a time. Accordingly, the cutting of the door portion 200 can be easily accomplished.

Further, since the door portion 200 is cut away in a direction after the tear line 100 is torn starting from the specific location thereof, the door portion 200 can acquire a smooth cutting plane along the tear line 100.

With the above described cutting operation, the door portion 200 is separated from the instrument panel 10, to prevent a damage to the passenger due to a collision with the door portion 200.

The tear line 100 includes an exploding section 50 defining the lower end of the door portion 200 and adapted to be torn firstly upon the inflation of the air bag, sidewall sections 60 defining both side ends of the door portion 200 and adapted to be torn secondly upon the inflation of the air bag, and a hinge section 70 defining the upper end of the door portion 200 and adapted to be torn thirdly upon the inflation of the air bag.

More-specifically, upon the inflation of the air bag, the lower end of the door portion 200, i.e. the exploding section 50 is torn firstly, and then, the sidewall sections 60 are torn. If the sidewall sections 60 are completely torn, the door portion 200 can be pivotally rotated upward about the hinge section 70, to make a hole in the instrument panel 10. If the hinge section 70 is finally torn, the separation of the door portion 200 is completed.

Here, the exploding section 50 has a plurality of first recesses 52 arranged consecutively by a predetermined interval, and first protrusions 54 located between the respective first recesses 52. The first protrusions 54 have a thickness b thinner than a thickness a of the instrument panel 10.

The thickness b of the first protrusions 54 is thinner than the thickness a of the instrument panel 10, and also, is thinner than a thickness of third protrusions 74 of the hinge section 70 which will be described hereinafter. Also, the first protrusions 54 have a length e shorter than a length of second protrusions 64 of the sidewall sections 60 which will be described hereinafter. With this configuration, the exploding section 50 can be torn firstly.

Each of the sidewall sections 60 has a plurality of second recesses 62 arranged consecutively by a predetermined interval, and second protrusions 64 located between the respective second recesses 62. The second protrusions 64 have a thickness thinner than the thickness a of the instrument panel 10, and also have a length f longer than the length e of the first protrusions 54.

Even though the second protrusions 64 have the same thickness b as that of the first protrusions 54, the length f of the second protrusions 64 is longer than the length e of the first protrusions 54. Therefore, the sidewall sections 60 will be torn later than the exploding section 50.

Also, since the second protrusions 64 have the thickness thinner than a thickness of the third protrusions 74 of the hinge section 70 that will be described hereinafter, the sidewall sections 60 will be torn earlier than the hinge section 70.

Alternatively, regardless of the length of the second protrusions 64, only the thickness of the second protrusions 64 may be changed to induce a stepwise cutting operation. In this case, the thickness b of the second protrusions 64 must be thinner than the thickness a of the third protrusions 74, but must be thicker than the thickness of the first protrusions 54 of the exploding section 50, to accomplish the stepwise cutting of the tear line 100.

The hinge section 70 has a plurality of third recesses 72 arranged consecutively by a predetermined interval, and the third protrusions 74 located between the respective third recesses 72. The third protrusions 74 have the thickness a thicker than the thickness b of the first protrusions 54 and the second protrusions 64.

Since the thickness of the third protrusions 74 is thicker than that of the first and second protrusions 54 and 64, the hinge section 70 will be torn last. More specifically, when the sidewall sections 60 are torn after the exploding section 50 was torn, the door portion 200 is pivotally rotated about the hinge section 70, to accomplish the stepwise cutting of the tear line 100.

Preferably, the third protrusions 74 have the same thickness as the thickness of the instrument panel 10.

It is noted that the thickness of the third protrusions 74 may be thinner than the thickness a of the instrument panel 10 so long as the thickness of the third protrusions 74 is thicker than the thickness b of the first protrusions 54 and the second protrusions 64. However, when the third protrusions 74 and the instrument panel 10 have the same thickness a as each other, it has the effect of omitting an operation of processing the third protrusions 74, and consequently, simplifying the overall forming process of the tear line 100.

Now, dimensions of the above described first recesses 52, second recesses 62, and third recesses 72 and dimensions of the above described first protrusions 54, second protrusions 64, and third protrusions 74 will be described by example.

First, assuming that the thickness a of the instrument panel 10 is 4.0 mm, the first recesses 52, second recesses 62, and third recesses 72 have a thickness c of 0.8 mm, and the thickness b of the first protrusions 54 and second protrusions 64 is 3.0 mm.

In this case, the thickness of the third protrusions 74 must be thicker than the thickness b of the first and second protrusions 54 and 64, and more particularly, must exceed a value of 3.0 mm, to allow the hinge section 70 to be torn last.

Here, it will be appreciated that the thickness of the third protrusions 74 preferably has a value of 4.0 mm equal to the thickness a of the instrument panel 10.

Also, assuming that the length e of the first protrusions 54 and the third protrusions 74 is 1.0 mm, the length f of the second protrusions 64 must be longer than the length e of the first protrusions 54, and for example, must be 2.0 mm, to allow the sidewall sections 60 to be torn later than the exploding section 50.

Since the length f of the second protrusions 64 is longer than the length e of the third protrusions 74, but the thickness b of the second protrusions 64 is thinner than the thickness a of the third protrusions 74, the sidewall sections 60 can be torn earlier than the hinge section 70.

The above mentioned numerical values are obtained under the assumption that the thickness a of the instrument panel 10 is 4.0 mm, and a tolerance limit of about 10% to 15% must be given to the numerical values.

For example, assuming that the thickness a of the instrument panel 10 is 4.0 mm, the same operation as the above description can be accomplished so long as the thickness c of the first recesses 52, second recesses 62, and third recesses 72 is in a range of 0.7 mm to 0.9 mm.

In addition, although the thickness a of the instrument panel 10 given by example is 4.0 mm, the thickness of the instrument panel 10 can be changed within the tolerance limit of 10% to 15%, and also, the length of the protrusions can be changed within the tolerance limit of 10% to 15%.

Hereinafter, the operation of the vehicular instrument panel according to the embodiment of the present invention having the above described configuration will be described.

After completing the manufacture of the instrument panel 10, the first recesses 52, second recesses 62, and third recesses 72 are formed on the instrument panel 10. Simultaneously with the forming of these recesses 52, 62, and 72, the first protrusions 54, second protrusions 64, and third protrusions 74 are formed on the instrument panel 10, thereby providing the instrument panel 10 with the tear line 100 and consequently, the door portion 200.

In the present invention, the tear line 100 is formed by milling. Specifically, the first recesses 52, second recesses 62, and third recesses 72 constituting the tear line 100 are formed by processing an inner wall surface of the instrument panel 10 by means of a milling machine (not shown).

Here, the used milling machine is a conventionally used one, and thus, a detailed description or illustration thereof will be omitted herein.

Upon the inflation of the air bag, the formed tear line 100 begins to be torn starting from the exploding section 50 thereof, which has the relatively thin first protrusions 54. Subsequently, the sidewall sections 60 of the tear line 100, which have the second protrusions 64 having the same thickness as that of the first protrusions 54, but having the longer length f than that of the first protrusions 54, are torn secondly. Thereafter, if the hinge section 70 of the tear line 100, which has the third protrusions 74 of the thickest thickness a, is torn, the door portion 200 is completely separated from the instrument panel 10, making a hole in the instrument panel 10.

Considering the separation sequence of the door portion 200, first, the door portion 200 is cut away starting from the lower end thereof, and then, is pivotally rotated upward so as to be separated from the instrument panel 10. Accordingly, the door portion 200 can be easily and rapidly separated from the instrument panel 10, and restrict a collision with the passenger.

Moreover, since the door portion 200 is cut away stepwise in the sequence of the lower end, side ends, and upper end thereof, the door portion 200 can acquire a smooth cutting plane along the tear line 100, and prevent a damage to the passenger's body due to the cutting plane.

Figure 8:
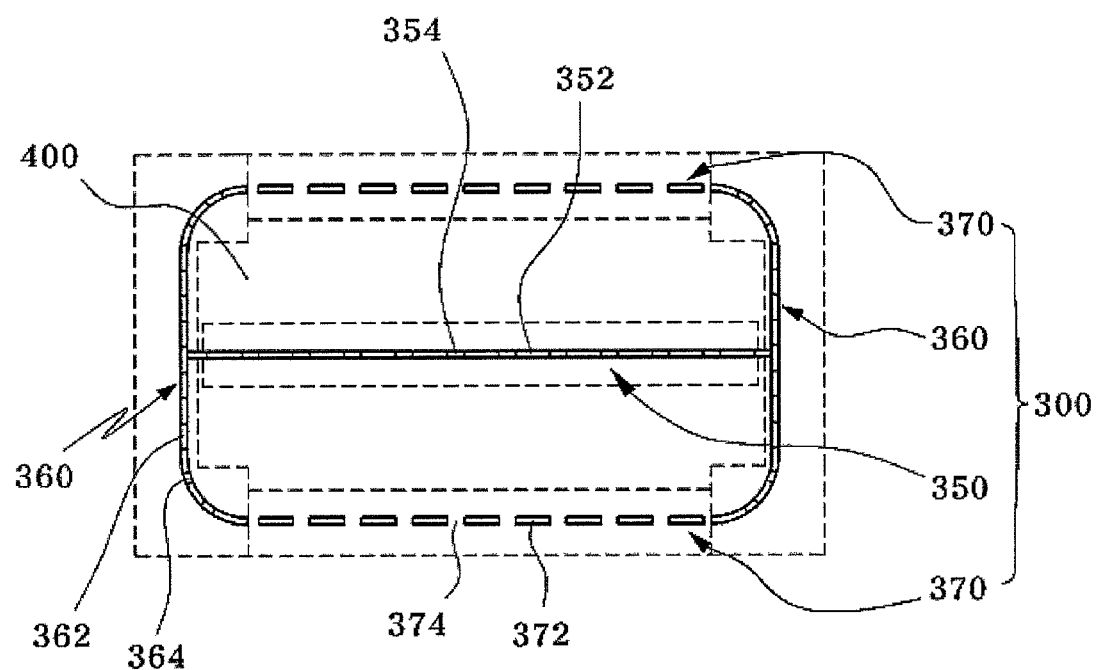
FIG. 8 is a bottom view illustrating a door portion of a vehicular instrument panel according to another embodiment of the present invention.

FIG. 8 is a bottom view illustrating a door portion of the vehicular instrument panel according to another embodiment of the present invention.

Referring to FIG. 8, a tear line 300 included in the vehicular instrument panel according to another embodiment of the present invention includes an exploding section 350 located at the center of a door portion 400 and adapted to be torn firstly upon the inflation of the air bag, sidewall sections 360 defining both side ends of the door portion 400 and adapted to be torn secondly upon the inflation of the air bag, and hinge sections 370 defining upper and lower ends of the door portion 400 and adapted to be torn thirdly upon the inflation of the air bag.

With the above described configuration, upon the inflation of the air bag, the tear line 300 begins to be torn starting from the exploding section 350 located at the center of the door portion 400. After the exploding section 350 is completely torn, the door portion 400 is divided into two pieces, i.e. upper and lower pieces. Thereby, as the upper and lower pieces of the door portion 400 are pivotally rotated upward and downward, respectively, the sidewall sections 360 of the tear-line 300 are torn.

Subsequently, after the sidewall sections 360 are completely torn, the hinge sections 370 defining the upper and lower ends of the door portion 400 are torn, causing the door portion 400 to be completely separated from the instrument panel 10 and making a hole in the instrument panel 10.

The tear line 300 for the vehicular instrument panel according to the present embodiment has approximately the same configuration as the tear line 100 of the above described embodiment, and differs from the tear line 100 only in the arrangement of the respective sections thereof. Therefore, the tear line 300 of the present embodiment exhibits the above described separating operation. Now, the operation of the tear line 300 will be described in detail.

The exploding section 350 has a plurality of first recesses 352 arranged consecutively by a predetermined interval, and first protrusions 354 located between the respective first recesses 352. The first protrusions 354 have a thickness (See reference character b in FIG. 3) thinner than a thickness (See reference character a in FIG. 3) of the instrument panel 10.

The thickness b of the first protrusions 354 is thinner than the thickness a of the instrument panel 10, and also, is thinner than a thickness of third protrusions 374 of the hinge sections 370 which will be described hereinafter. Also, the first protrusions 354 have a length (See reference character e in FIG. 3) shorter than a length of second protrusions 364 of the sidewall sections 360 which will be described hereinafter. With this configuration, the exploding section 350 can be torn firstly.

Each of the sidewall sections 360 has a plurality of second recesses 362 arranged consecutively by a predetermined interval, and second protrusions 364 located between the respective second recesses 362. The second protrusions 364 have a thickness thinner than the thickness a of the instrument panel 10, and also, have a length (See reference character f in FIG. 4) longer than the length e of the first protrusions 354.

Even though the second protrusions 364 have the same thickness b as that of the first protrusions 354, the length f of the second protrusions 364 is longer than the length e of the first protrusions 354. Therefore, the sidewall sections 360 will be torn later than the exploding section 350.

Also, since the second protrusions 364 have the thickness thinner than the thickness of the third protrusions 374 of the hinge sections 370, the sidewall sections 360 will be torn earlier than the hinge sections 370.

Alternatively, regardless of the length of the second protrusions 364, only the thickness of the second protrusions 364 may be changed to induce a stepwise cutting operation. In this case, the thickness of the second protrusions 364 must be thinner than the thickness a of the third protrusions 374, but must be thicker than the thickness of the first protrusions 354 of the exploding section 350, to accomplish the stepwise cutting of the tear line 300.

Each of the hinge sections 370 has a plurality of third recesses 372 arranged consecutively by a predetermined interval, and the third protrusions 374 located between the respective third recesses 372. The third protrusions 374 have the thickness a thicker than the thickness b of the first protrusions 354 and the second protrusions 364.

Since the thickness of the third protrusions 374 is thicker than that of the first and second protrusions 354 and 364, the hinge sections 370 will be torn last. More specifically, when the sidewall sections 360 are torn after the exploding section 350 was torn, the divided two pieces of the door portion 400 are pivotally rotated, respectively, about the hinge sections 370, to complete the stepwise cutting of the tear line 300.

Preferably, the third protrusions 374 have the same thickness as the thickness of the instrument panel 10. As described in the previous embodiment, this has the effect of simplifying the overall forming process of the tear line 300.

With the above described structural feature of the present embodiment, the tear line 300 begins to be torn starting from the exploding section 350 located at the center of the door portion 400. Then, if the sidewall sections 360 are torn secondly and the hinge sections 370 are torn thirdly, the door portion 400 can be completely separated from the instrument panel 10.

Although the preferred embodiments of the present invention have been disclosed with reference to the drawings for illustrative purposes, those skilled in the art will appreciate that various modifications, additions and substitutions of the preferred embodiments are possible.

Also, although a vehicular instrument panel has been described, it is given only by example, and the present invention can be applied to other instrument panels for use in various products except for vehicles.

Accordingly, the technical protection range of the invention should be determined by the accompanying claims.

As apparent from the above description, the present invention provides a vehicular instrument panel, in which a tear line defining a door portion includes an exploding section, sidewall sections, and a hinge section. With the use of the tear line, upon a car collision, the door portion can be cut away from the instrument panel as the tear line is torn consecutively starting from the exploding section thereof. This has an advantage of easily and rapidly separating the door portion from the instrument panel even by an external pressure below a predetermined value, thereby preventing the risk of a collision between the passenger and the door portion.

Further, according to the present invention, since recesses constituting the tear line of the door portion are formed by milling, the door portion can be formed by use of relatively low-price equipment. This has an advantage of reducing manufacturing costs of the instrument panel.

What is claimed is:

1. A vehicular instrument panel, comprising:
   a door portion provided on the instrument panel at a position corresponding to an air bag; and
   a tear line provided on the instrument panel to define a boundary between the door portion and the instrument panel,
   the tear line comprising:
      an exploding section having first protrusions and first recesses, wherein the exploding section is configured to be torn firstly upon inflation of the air bag;
      sidewall sections having second protrusions and second recesses, wherein the sidewall sections are configured to be torn secondly upon the inflation of the air bag;
      a hinge section having third protrusions and third recesses, wherein the hinge section is configured to be torn thirdly upon the inflation of the air bag; and
      the first protrusions having a thickness equal to a thickness of the second protrusions,
      the first protrusions having a length equal to a length of the third protrusions, and
      a thickness of the third protrusions being greater than the thickness of the first protrusions and the thickness of the second protrusions, wherein
      the tear line is configured to be torn upon collision.

2. The instrument panel according to claim 1, wherein the tear line comprises:
   the exploding section defining a lower end of the door portion;
   sidewall sections defining side ends of the door portion; and
   a hinge section defining an upper end of the door portion.

3. The instrument panel according to claim 2, wherein the exploding section comprises:
   the first recesses arranged consecutively by a predetermined interval; and
   the first protrusions located between respective first recesses,
   wherein the thickness of the first protrusions is thinner than a thickness of the instrument panel.

4. The instrument panel according to claim 3, wherein each of the sidewall sections comprises:
   the second recesses arranged consecutively by a predetermined interval; and
   the second protrusions located between respective second recesses,
   wherein the thickness of the second protrusions is thinner than the thickness of the instrument panel, and a length of the second protrusions is longer than the length of the first protrusions.

5. The instrument panel according to claim 3, wherein the hinge section comprises:
   the third recesses arranged consecutively by a predetermined interval; and
   the third protrusions located between respective third recesses.

6. The instrument panel according to claim 5, wherein each of the sidewall sections comprises:
   the second recesses arranged consecutively by a predetermined interval; and
   the second protrusions located between respective second recesses.

7. The instrument panel according to claim 5, wherein the thickness of the third protrusions is equal to the thickness of the instrument panel.

8. The instrument panel according to claim 5, wherein the tear line is formed by milling.

9. The instrument panel according to claim 3, wherein the tear line is formed by milling.

10. The instrument panel according to claim 2, wherein the tear line is formed by milling.

11. The instrument panel according to claim 1, wherein the tear line comprises:
    the exploding section located at the center of the door portion;
    the sidewall sections defining side ends of the door portion; and
    the hinge section including hinge sections defining upper and lower ends of the door portion.

12. The instrument panel according to claim 11, wherein the exploding section comprises:
    the plurality of first recesses arranged consecutively by a predetermined interval; and
    the first protrusions located between respective first recesses,
    wherein the thickness of the first protrusions is thinner than a thickness of the instrument panel.

13. The instrument panel according to claim 12, wherein each of the sidewall sections comprises:
    the plurality of second recesses arranged consecutively by a predetermined interval; and
    the second protrusions located between respective second recesses,
    wherein the thickness of the second protrusions is thinner than the thickness of the instrument panel and a length of the second protrusions is longer than the length of the first protrusions.

14. The instrument panel according to claim 12, wherein each of the hinge sections comprises:
    the plurality of third recesses arranged consecutively by a predetermined interval; and
    the third protrusions located between respective third recesses.

15. The instrument panel according to claim 14, wherein each of the sidewall sections comprises:
    the second recesses arranged consecutively by a predetermined interval; and
    the second protrusions located between respective second recesses.

16. The instrument panel according to claim 14, wherein the thickness of the third protrusions is equal to the thickness of the instrument panel.

17. The instrument panel according to claim 14, wherein the tear line is formed by milling.

18. The instrument panel according to claim 12, wherein the tear line is formed by milling.

19. The instrument panel according to claim 11, wherein the tear line is formed by milling.

20. The instrument panel according to claim 1 wherein the tear line is formed by milling.

* * * * *